(12) United States Patent
Tomomatsu et al.

(10) Patent No.: US 12,072,488 B2
(45) Date of Patent: Aug. 27, 2024

(54) DISPLAY DEVICE, HEAD-UP DISPLAY, AND MOBILE OBJECT

(71) Applicant: Panasonic Intellectual Property Management Co., Ltd., Osaka (JP)

(72) Inventors: Shunsuke Tomomatsu, Osaka (JP); Yosuke Asai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/072,920

(22) Filed: Dec. 1, 2022

(65) Prior Publication Data

US 2023/0097752 A1 Mar. 30, 2023

Related U.S. Application Data

(63) Continuation of application No. PCT/JP2021/006905, filed on Feb. 24, 2021.

(30) Foreign Application Priority Data

Jun. 4, 2020 (JP) ................... 2020-097748

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *G02B 3/06* (2013.01); *G02B 3/08* (2013.01); *B60K 35/23* (2024.01)

(58) Field of Classification Search
CPC ........ G02B 27/0101; G02B 3/06; G02B 3/08; B60K 35/00; B60K 2370/1529
See application file for complete search history.

(56) References Cited

U.S. PATENT DOCUMENTS

2009/0201589 A1 8/2009 Freeman
2016/0209649 A1 7/2016 Shigeno et al.
(Continued)

FOREIGN PATENT DOCUMENTS

JP 10-133144 5/1998
JP 2011-227341 11/2011
(Continued)

OTHER PUBLICATIONS

International Search Report issued May 11, 2021 in International Application No. PCT/JP2021/006905, with English translation.
(Continued)

*Primary Examiner* — Hang Lin
(74) *Attorney, Agent, or Firm* — Wenderoth, Lind & Ponack, L.L.P.

(57) ABSTRACT

A display device includes a display panel, a plurality of light sources arranged in a first direction orthogonal to a normal direction of the display panel, a light guide panel on which light from a plurality of light sources is incident and including an emission surface that emits light toward the display panel, and a first optical member disposed between the display panel and the light guide panel and including a first surface opposing the emission surface of the light guide panel, a second surface provided opposite to the first surface to oppose the display panel, a Fresnel lens provided on the first surface, and an optical array provided on the second surface. As viewed in at least one of the first direction and a second direction orthogonal to both the normal direction and the first direction, the Fresnel lens emits light passing through a center of the display panel.

12 Claims, 8 Drawing Sheets

(51) Int. Cl.
    *G02B 3/06*     (2006.01)
    *G02B 3/08*     (2006.01)
    *B60K 35/23*     (2024.01)

(56) References Cited

U.S. PATENT DOCUMENTS

| | | | |
|---|---|---|---|
| 2016/0299342 A1* | 10/2016 | Asai | G02B 27/0101 |
| 2018/0210201 A1* | 7/2018 | Togasaki | G02F 1/133606 |
| 2018/0259773 A1* | 9/2018 | Asai | G02B 6/0038 |
| 2019/0162960 A1 | 5/2019 | Harada et al. | |
| 2019/0285790 A1 | 9/2019 | Usukura et al. | |
| 2019/0293934 A1* | 9/2019 | Asai | G02B 27/0101 |
| 2020/0089059 A1* | 3/2020 | Nakamura | G02B 27/0101 |

FOREIGN PATENT DOCUMENTS

| | | |
|---|---|---|
| JP | 2015-45735 | 3/2015 |
| JP | 2019-101056 | 6/2019 |
| WO | 2007/049618 | 5/2007 |
| WO | 2017/094209 | 6/2017 |

OTHER PUBLICATIONS

Translation of the International Preliminary Report on Patentability issued Dec. 15, 2022 in International Application No. PCT/JP2021/006905.
Extended European Search Report issued Nov. 3, 2023 in corresponding European Patent Application No. 21817478.7.

\* cited by examiner

DISPLAY DEVICE, HEAD-UP DISPLAY, AND MOBILE OBJECT

CROSS-REFERENCE TO RELATED APPLICATIONS

This is a continuation application of International Application No. PCT/JP2021/006905, with an international filing date of Feb. 24, 2021, which claims priority of Japanese Patent Application No. 2020-097748 filed on Jun. 4, 2020, the content of which is incorporated herein by reference.

BACKGROUND OF THE INVENTION

1. Technical Field

The present disclosure relates to a display device, a head-up display including the display device, and a mobile object including the head-up display.

2. Description of Related Art

Patent Document 1 discloses a head-up display that is mounted on a vehicle and includes a display device. A light (image) output from the head-up display is guided into an eye-box of an occupant (observer) through a windshield.

The display device of the head-up display described in Japanese Unexamined Patent Application Publication No. 2019-101056 A includes a lighting device (backlight device) and a transmissive display panel (liquid crystal display panel) that displays an image. The lighting device includes a plurality of light sources (LEDs) arranged in a matrix. A light emitted from each of the light sources passes through a display panel and arrives at the eye-box.

However, in a case of the display device of the head-up display described in Japanese Unexamined Patent Application Publication No. 2019-101056 A, cyclic unevenness in luminance corresponding to an arrangement pattern of a plurality of light sources may be present in an image, visually recognized by an observer by a light arriving at an eye-box entering an eye of the observer, that is, a virtual image. In particular, a higher output of a light source causes greater cyclic unevenness in luminance.

SUMMARY

Thus, an object of the present disclosure is to suppress cyclic unevenness in luminance in an image visually recognized by an observer for a display device of a head-up display including a plurality of light sources.

According to one aspect of the present disclosure,
a display device including
a display panel that displays an image;
a plurality of light sources arranged in a first direction orthogonal to a normal direction of the display panel;
a light guide panel on which a light from the plurality of light sources is incident and including an emission surface that emits a light toward the display panel; and
a first optical member disposed between the display panel and the light guide panel and including a first surface opposing the emission surface of the light guide panel, a second surface provided opposite to the first surface to oppose the display panel, a Fresnel lens provided on the first surface, and an optical array provided on the second surface, wherein
the optical array emits and diffuses a light toward the display panel, and wherein
as viewed in at least one of the first direction and a second direction orthogonal to both the normal direction and the first direction, the Fresnel lens emit a light passing through a center of the display panel in a direction inclined with respect to the normal direction, is provided According to other aspect of the present disclosure,
a display device including
a display panel that displays an image;
a light source unit that emits a flat light toward the display panel, and
a first optical member disposed between the display panel and the light source unit and including a first surface on which a light from the light source unit is incident, a second surface provided opposite to the first surface to oppose the display panel, a Fresnel lens provided on the first surface, and an optical array provided on the second surface, wherein
the optical array emits and diffuses a light toward the display panel, and wherein
as viewed in at least one of the first direction and a second direction orthogonal to both the normal direction and the first direction, the Fresnel lens emit a light passing through a center of the display panel in a direction inclined with respect to the normal direction, is provided.

According to another aspect of the present disclosure,
a head-up display including the display device described above is provided.

According to further another aspect of the present disclosure,
a mobile object including the head-up display described above, and
a windshield on which an image output from the head-up display is projected is provided.

According to the present disclosure, a display device of a head-up display including a plurality of light sources can suppress cyclic unevenness in luminance in an image visually recognized by an observer.

DETAILED DESCRIPTION

Hereinafter, embodiments will be described in detail with reference to the drawings as appropriate. Unnecessarily detailed description may be omitted. For example, detailed description of a well-known matter and a repeated description of substantially the same configuration may be omitted. This is to avoid unnecessary redundancy of the following description and to facilitate understanding of those skilled in the art.

Note that, the inventor (inventors) provides the accompanying drawings and the following description in order for those skilled in the art to fully understand the present disclosure, and does not intend to limit the subject matter described in the claims by the accompanying drawings and the following description.

Display devices according to a plurality of embodiments of the present disclosure will be described with reference to FIGS. 1 to 9.

Figure 1:
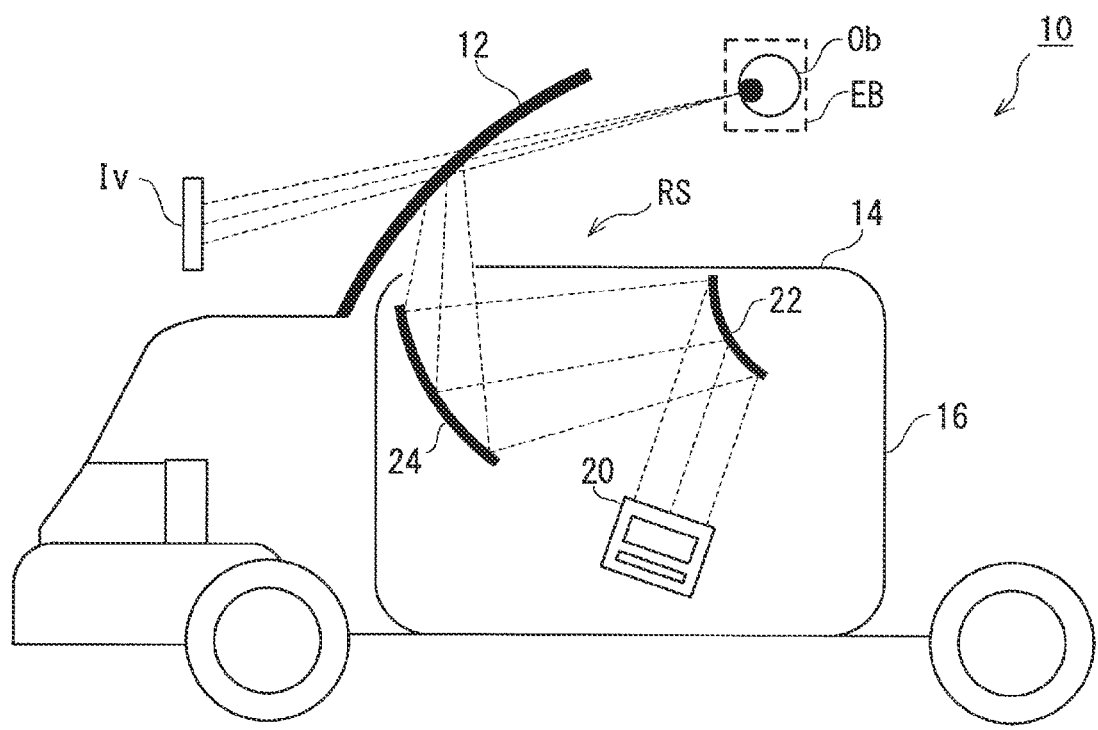
FIG. 1 is a schematic view of a vehicle on which a head-up display according to one embodiment of the present disclosure is mounted.

FIG. 1 is a schematic view of a vehicle mounted with a head-up display according to one embodiment of the present disclosure.

As illustrated in FIG. 1, a vehicle 10 is, for example, an automobile, and is mounted with a head-up display 14 that projects a light (image) onto a transparent windshield 12, that is, a front window.

A light (image) output from the head-up display 14 is guided into an eye-box EB of an observer Ob, such as a driver in the vehicle 10, via the windshield 12. This allows the observer Ob to visually recognize a virtual image Iv. That is, the observer Ob visually recognizes a scenery seen through the windshield 12 and the virtual image Iv superimposed on the scenery. The eye-box EB is a spatial region that the observer Ob can visually recognize the virtual image Iv with no portion of the virtual image Iv missing.

The head-up display 14 includes a housing 16. A display device 20 and a plurality of mirrors 22 and 24 for guiding a light (image) output from the display device 20 to the windshield 12 are provided inside the housing 16. For example, a convex mirror 22 that reflects a light output from the display device 20 and a concave mirror 24 that reflects and directs a light from the convex mirror 22 toward the windshield 12 are provided in the housing 16. The windshield 12 and a plurality of mirrors 22 and 24 constitute a reflective optical system RS that guides a light output from the display device 20 to the eye-box EB of the observer Ob. The reflective optical system RS, from the display device 20 to the eye-box EB, differs among different conditions of mounting the head-up display 14 in vehicles.

Figure 2:
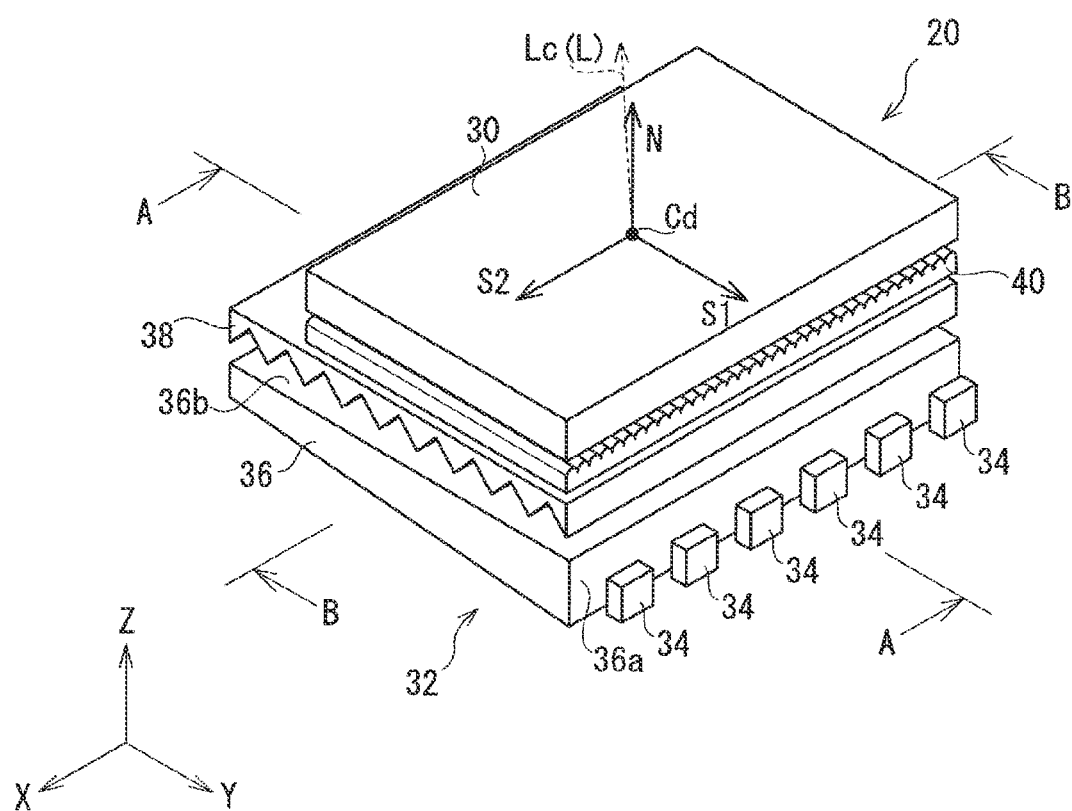
FIG. 2 is a perspective view of a display device according to one embodiment of the present disclosure.
Figure 3:
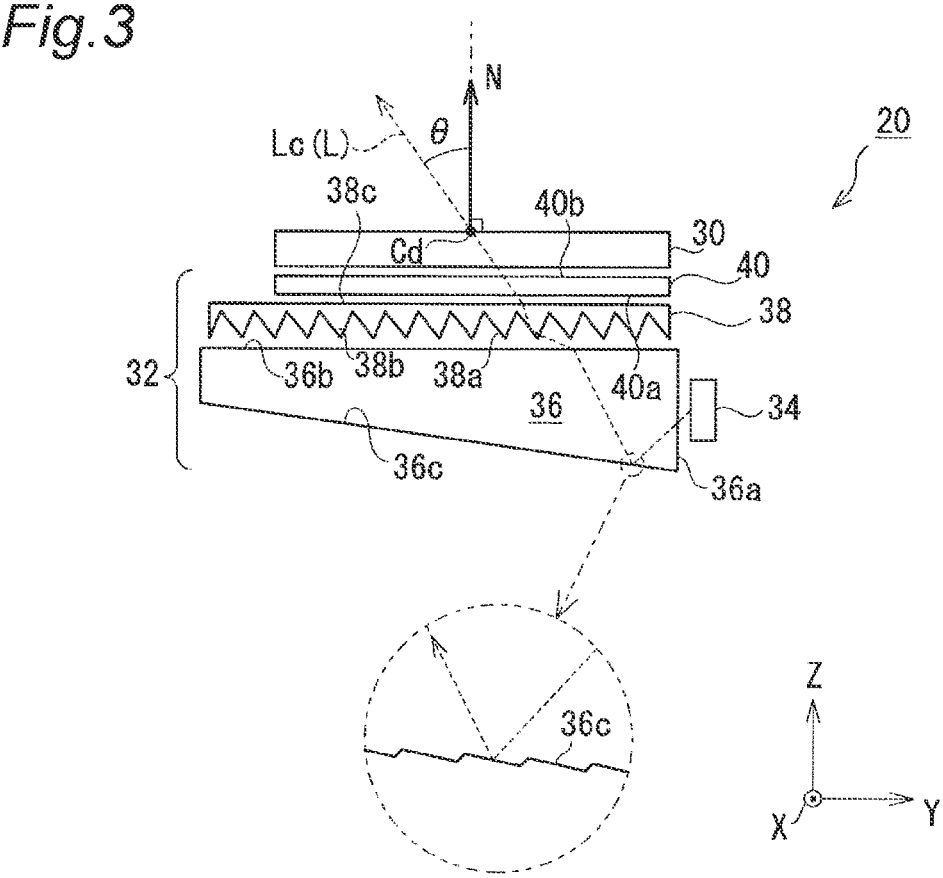
FIG. 3 is a cross-sectional view of the display device taken along line A-A in FIG. 2.
Figure 4:
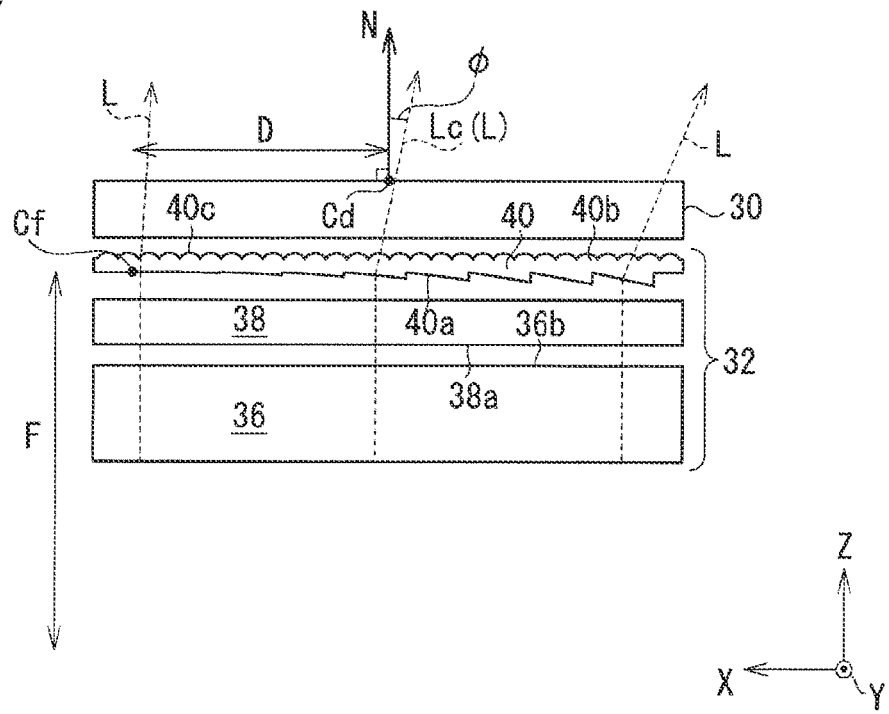
FIG. 4 is a cross-sectional view of the display device taken along line B-B in FIG. 2.

FIG. 2 is a perspective view of a display device according to one embodiment of the present disclosure. FIG. 3 is a cross-sectional view of the display device taken along line A-A in FIG. 2. FIG. 4 is a cross-sectional view of the display device taken along line B-B in FIG. 2. Note that, an X-Y-Z coordinate system in the drawings is for facilitating understanding of the present disclosure, and does not limit the present disclosure.

As illustrated in FIGS. 2 and 3, the display device 20 according to the present embodiment includes a display panel 30 that displays an image, and a lighting device 32 that emits a light toward the display panel 30.

In the present exemplary embodiment, the display panel 30 is a transmissive liquid crystal panel. In the present embodiment, the display panel 30 has a rectangular shape having a lateral direction S1 (Y-axis direction) and a longitudinal direction S2 (X-axis direction). That is, the display panel 30 displays an image having a lateral direction and a longitudinal direction.

The lighting device 32 includes a plurality of light sources 34, and a light guide panel 36 that guides a light emitted from a plurality of light sources 34 toward the display panel 30. In addition, a plurality of light sources 34 is arranged in a direction orthogonal to a normal direction N of the display panel 30 (first direction), that is, in a longitudinal direction S2 (X-axis direction) of the display panel 30 in the present embodiment.

In the present embodiment, a plurality of light sources 34 is LEDs. The number of light sources is not limited to 6 as illustrated in FIG. 2, and may be 2 to 5 or 7 or more.

The light guide panel 36 is a panel-shaped member made of a transparent material, for example, a resin material. Specifically, the light guide panel 36 includes an incident surface 36a opposing a plurality of light sources 34, an emission surface 36b opposing the display panel 30, and a reflection surface 36c opposing the emission surface 36b. In the present embodiment, the incident surface 36a is vertical to (by 85 to 95 degrees) and adjacent to the emission surface 36b.

In the present embodiment, as illustrated in FIGS. 2 and 3, each of a plurality of light sources 34 opposes the incident surface 36a of the light guide panel 36 in the lateral direction S1 (Y-axis direction) of the display panel 30. A plurality of light sources 34 is arranged in the longitudinal direction S2 (X-axis direction) of the display panel 30 along the incident surface 36a. A light emitted from each of a plurality of light sources 34 enters the light guide panel 36 via the incident surface 36a. The entering light is reflected a plurality of times on the emission surface 36b and the reflection surface 36c, and eventually emitted from the emission surface 36b.

The emission surface 36b of the light guide panel 36 is a surface opposing the display panel 30. In the present embodiment, the display panel 30 is disposed parallel to the emission surface 36b of the light guide panel 36. The light emitted from the emission surface 36b passes through the display panel 30 and eventually arrives at the eye-box EB of the observer Ob.

Furthermore, in the present embodiment, the display device 20 includes two optical members 38 and 40 between the display panel 30 and the light guide panel 36.

Figure 5A:
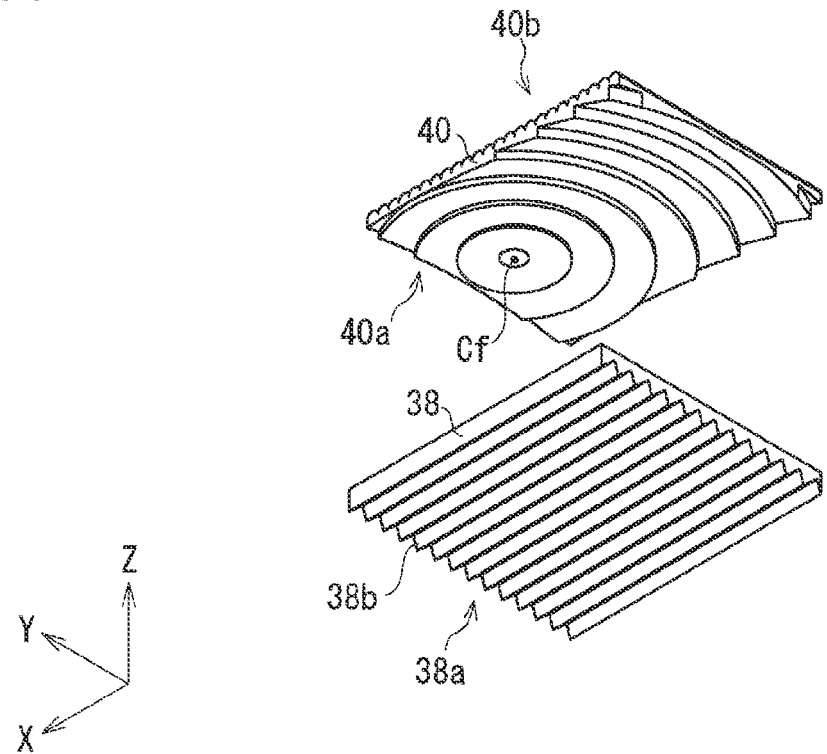
FIG. 5A is a perspective view of two optical members as viewed from a light guide panel side.
Figure 5B:
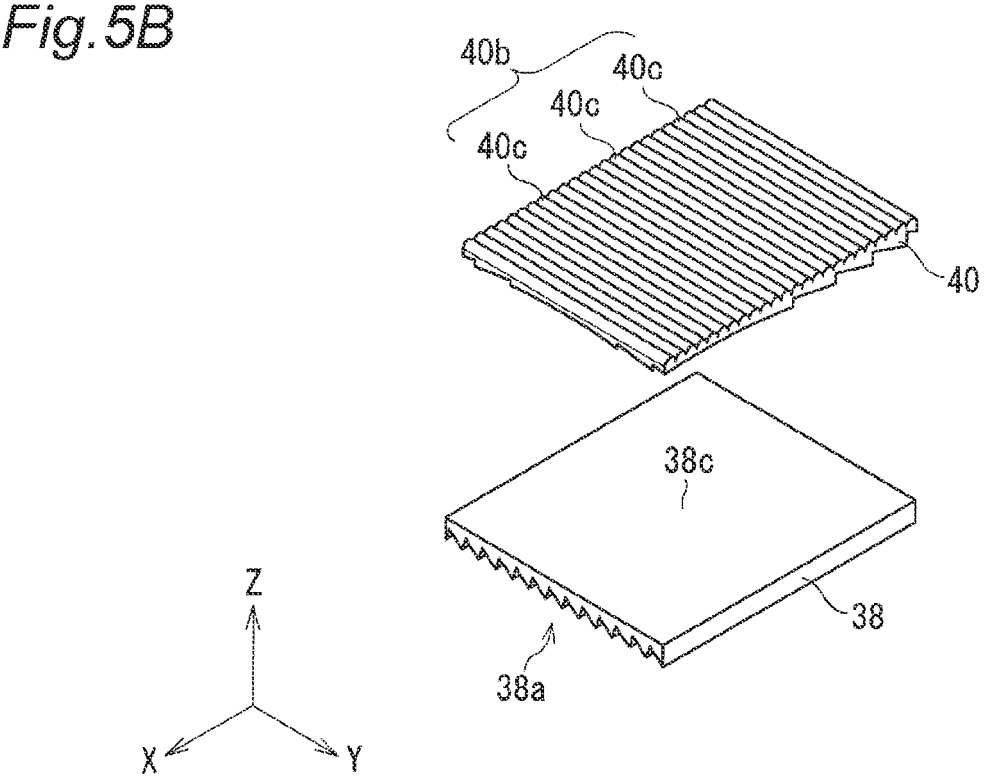
FIG. 5B is a perspective view of the two optical members as viewed from a display panel side.

FIG. 5A is a perspective view of the two optical members as viewed from the light guide panel side. FIG. 5B is a perspective view of the two optical members as viewed from the display panel side.

In the present embodiment, as illustrated in FIG. 2, the display panel 30 emits light L (image light) not in a normal direction N (Z-axis direction) but in a direction inclined from the normal direction N. Specifically, as illustrated in FIG. 3, the display panel 30 emits light Lc in a direction inclined at a first angle from the normal direction N as viewed in the longitudinal direction S2 (X-axis direction) of the display panel 30. At the same time, as illustrated in FIG. 4, the display panel 30 emits the light Lc in a direction inclined at a second angle φ from the normal direction N as viewed in the lateral direction S1 (Y-axis direction) of the display panel 30. The light Lo is a portion of entire light L travelling from the display panel 30 toward the eye-box EB and travels from a center of a transmissive region of the display panel 30 toward a center of the eye-box EB (for example, a center between two eyes of a driver sitting in a driver's seat). The "transmissive region" is a region allowing a light to pass therethrough, and where an image (picture) is formed. That is, the lighting device 32 emits the light L toward the display panel 30 at an inclination angle with respect to the normal direction N. With the inclination angle, an external light such as sunlight, reflected on the display panel 30, travelling along an optical path along which the light L of the lighting device 32 travels to eventually arrive at the eye-box EB can be suppressed.

In this regard, the lighting device 32 includes an optical member (second optical member) 38 that causes the light Lo to be emitted at a first angle θ with respect to the normal direction N of the display panel 30 as viewed in the longitudinal direction S2 (X-axis direction) of the display panel 30. The lighting device 32 also includes an optical member (first optical member) 40 that causes the light Lc to be emitted at a second angle φ with respect to the normal direction N of the display panel 30 as viewed in the lateral direction S1 (Y-axis direction) of the display panel 30.

The optical member 38, among the two optical members, is a panel-shaped member made of a transparent material, for example, a resin material. The optical member 38 is disposed between the display panel 30 and the light guide panel 36, and the light L emitted from the emission surface 36b of the light guide panel 36 is incident on the optical member 38.

Furthermore, as illustrated in FIGS. 3 and 5A, the optical member (second optical member) 38 is provided with a prism array 38a on a surface opposing the emission surface 36b of the light guide panel 36. The prism array 38a includes a plurality of prisms 38b arranged in the lateral direction S1 (Y-axis direction) of the display panel 30 as viewed in the normal direction N (Z-axis direction) of the display panel 30. A plurality of prisms 38b is arranged at a constant pitch that is sufficiently large with respect to a wavelength of the light L.

The light L from the emission surface 36b of the light guide panel 36 is incident on the optical member 38 through the prism array 38a, and the optical member 38 emits the light L at a first angle θ from an emission surface 38c opposing the display panel 30. The prisms 38b of the prism array 38a are optically designed so that a light can be emitted at the first angle θ. The first angle θ of the light Lc travelling from a center Cd of the transmissive region of the display panel 30 toward the center of eye-box EB is required to have an absolute value within a range of, for example, 0°<|θ|≤45".

The optical member (first optical member) 40, among the two optical members, is a panel-shaped member made of a transparent material, for example, a resin material. The optical member 40 is disposed between the display panel 30 and the optical member 38, and the light L emitted from the optical member 38 is incident on the optical member 40.

Furthermore, as illustrated in FIG. 5A, the optical member 40 is provided with a Fresnel lens 40a on a first surface opposing the emission surface 36b of the light guide panel 36 with the optical member 38 therebetween. That is, the Fresnel lens 40a is provided to the optical member 40 so as to oppose the emission surface 38c of the optical member 38.

In the present embodiment, a center Cf of the Fresnel lens 40a is shifted from the center Cd of the transmissive region of the display panel 30 as viewed in the normal direction N of the display panel 30 (as viewed in the Z-axis direction), Specifically, the center Cf of the Fresnel lens 40a is shifted from the center Cd of the display panel 30 by a shift amount D in the longitudinal direction S2 (X-axis direction) of display panel 30. Due to this shift of the centers, the optical member 40 emits the light L in a direction inclined at the second angle φ from the normal direction N of the display panel 30 as viewed in the lateral direction S1 (Y-axis direction) of the display panel 30. Precisely, the optical member 40 emits the light Lc travelling from the center Cd of the transmissive region of the display panel 30 toward the center of the eye-box EB at the second angle φ with respect to the normal direction N.

In the present embodiment, the center Cf of the Fresnel lens 40a is shifted from the center of the shape of the optical member 40 as viewed in the normal direction N of the display panel 30 (as viewed in the Z-axis direction). As illustrated in FIG. 5A, the center Cf of the Fresnel lens 40a may be located on the optical member 40, or alternatively, located outside the optical member 40.

The Fresnel lens 40a is optically designed based on the required second angle φ and a focal length F of the Fresnel lens. Specifically, the shift amount D (central shift amount) between the center Cf of the Fresnel lens 40a and the center Cd of the display panel 30 is determined.

The relationship among the second angle φ, the central shift amount D, and the focal length F can be expressed by the following Formula 1.

$$\varphi = 90° - \tan^{-1}(F/D) \quad \text{[Formula 1]}$$

Furthermore, in the case of the present embodiment, as illustrated in FIG. 5B, the optical member 40 includes a cylindrical lens array 40b on a second surface provided opposite to a first surface to face the display panel 30. The cylindrical lens array 40b includes a plurality of cylindrical lenses 40c arranged in the same direction as the direction in which a plurality of light sources 34 are arranged, that is, in the longitudinal direction S2 (X-axis direction) of the display panel 30. Each of the cylindrical lenses 40c extends in the lateral direction S1 (Y-axis direction) of the display panel 30. The number of a plurality of cylindrical lenses 40c is larger than the number of a plurality of light sources 34, and a plurality of cylindrical lenses 40c is arranged in parallel at a narrow pitch. The reason will be described later. The function of the cylindrical lens array 40b will be described.

Figure 6:
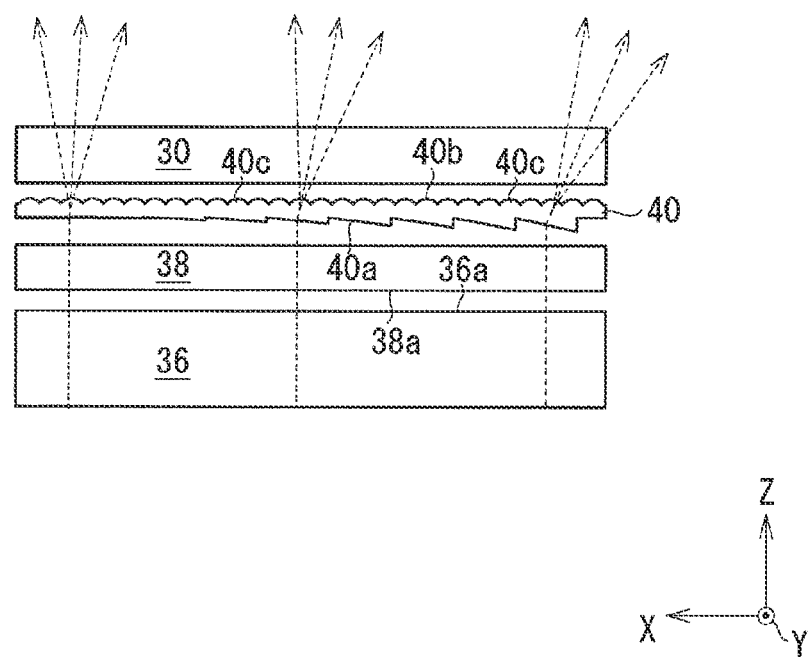
FIG. 6 is a view illustrating propagation of a light through a cylindrical lens array.

FIG. 6 is a view illustrating propagation of a light through the cylindrical lens array.

As illustrated in FIG. 6, portions of the light L that has emitted from the light guide panel 36 and passed through the optical member 38 are superposed to be incident on the cylindrical lens array 40b provided to the optical member 40 so as to oppose the display panel 30. The light L is emitted and diffused toward the display panel 30. That is, the light emitted from a plurality of cylindrical lenses 40c can be regarded as a surface light source having a further uniform spatial distribution given by the cylindrical lens array 40b. The light emitted from the cylindrical lens array 40b passes through the display panel 30. This suppresses happening of a pattern of cyclic unevenness in luminance corresponding to the arrangement pattern of a plurality of light sources 34 in the light L (image light), visually recognized by the observer Ob by the light arriving at the eye-box EB, that is, a virtual image Iv. This will be specifically described.

Figure 7:
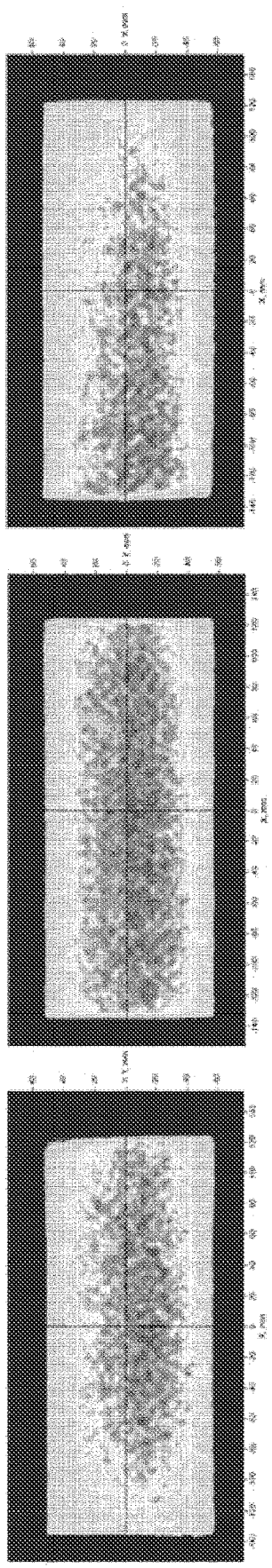
FIG. 7 is a view illustrating a luminance distribution of a virtual image visually recognized by an observer by a light output from the display device according to an example and arrived at an eye-box.

FIG. 7 is a view illustrating a luminance distribution of a virtual image visually recognized by an observer by a light output from a display device according to an example and arrived at an eye-box.

Figure 8:
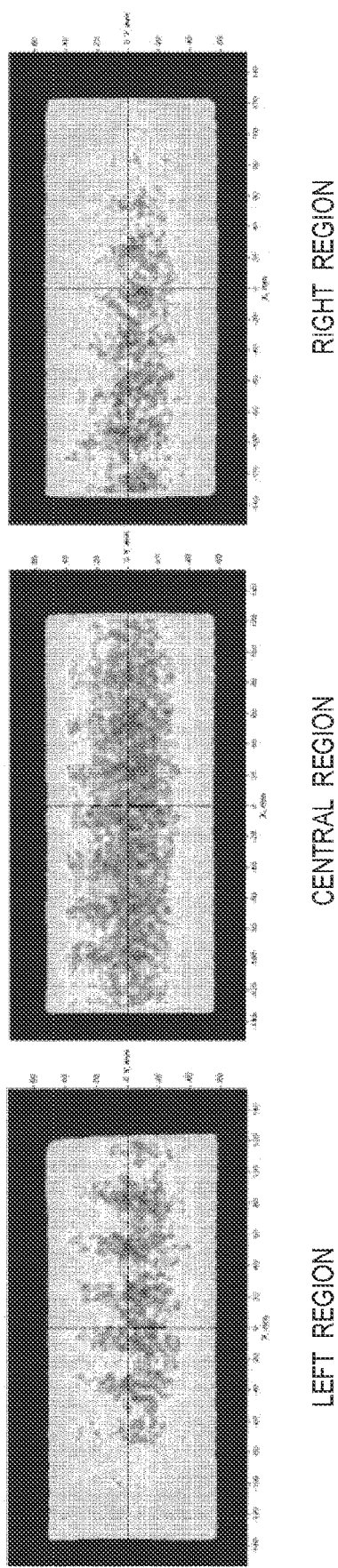
FIG. 8 is a view illustrating a luminance distribution of a virtual image visually recognized by an observer by a light output from a display device according to a first comparative example and arrived at an eye-box.

FIG. 8 is a view illustrating a luminance distribution of a virtual image visually recognized by an observer by a light output from a display device according to a first comparative example and arrived at an eye-box.

Figure 9:
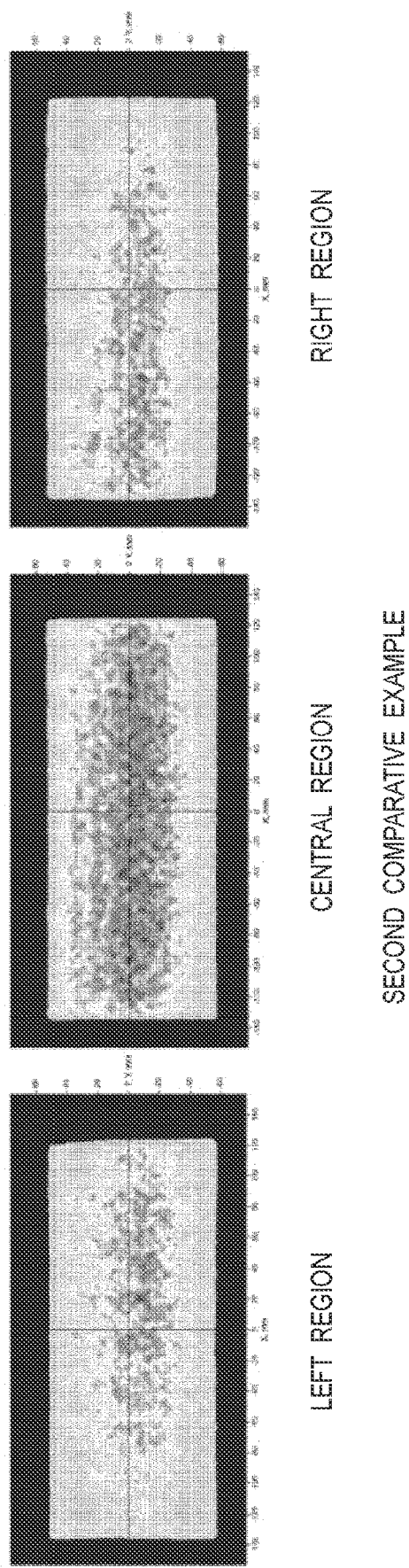
FIG. 9 is a view illustrating a luminance distribution of a virtual image visually recognized by an observer by a light output from a display device according to a second comparative example and arrived at an eye-box.

FIG. 9 is a view illustrating a luminance distribution of a virtual image visually recognized by an observer by a light output from a display device according to a second comparative example and arrived at an eye-box.

The luminance distributions illustrated in FIGS. 7 to 9 indicate luminance distributions of the virtual image Iv where the eyes of the observer Ob are respectively in a central region, a left region, and a right region of the eye-box EB. Furthermore, a left-right direction of the virtual image Iv corresponds to the arrangement direction of a plurality of light sources (X-axis direction). In the present embodiment, the left right direction corresponds to the longitudinal direction of the display panel. Furthermore, in the luminance distribution, a black portion in a middle of a screen, a white portion, and a gray portion in rims of a screen have higher luminance in this order.

The luminance distribution illustrated in FIG. 7 is a luminance distribution of an image (light) visually recognized in an eye-box of an observer by a light output from a display device of the example including nine light sources, and a cylindrical lens array provided on a display panel side of an optical member disposed between the display panel and a light guide panel. In the display device of the example, the nine light sources and a plurality of cylindrical lenses of the cylindrical lens array are arranged in a longitudinal direction of the display panel.

The luminance distribution illustrated in FIG. 8 is a luminance distribution of an image (light) visually recognized in an eye-box of the observer by a light output from a display device of the first comparative example including nine light sources and no optical member, that is, no cylindrical lens array, disposed between a display panel and a light guide panel. In the display device of the first comparative example, the nine light sources are arranged in the longitudinal direction of the display panel.

The luminance distribution illustrated in FIG. 9 is a luminance distribution of an image (light) visually recognized in an eye-box of the observer by a light output from a display device of the second comparative example including nine light sources, no optical member disposed between a display panel and a light guide panel, and a cylindrical lens array provided on an emission surface of the light guide panel. In the display device of the second comparative example, the nine light sources and a plurality of cylindrical lenses of the cylindrical lens array are arranged in the longitudinal direction of the display panel.

As illustrated in FIG. 8, in the case of the display device of the first comparative example including no cylindrical lens array, a plurality of high luminance portions is separately and cyclically distributed along the left-right direction of the virtual image Iv at a pitch corresponding to the arrangement pattern of the nine light sources, that is, the arrangement pitch of the light sources.

In particular, a plurality of high luminance portions at a constant pitch along the left-right direction of the virtual image Iv visually recognized in the right region and the left region in the eye-box, that is, cyclic unevenness in luminance is notably observed.

In contrast, in the case of the display device of the example as Illustrated in FIG. 7, a high luminance portion is not separated into a plurality of portions, which differs from the first comparative example illustrated in FIG. 8. That is, distributed high luminance portions are aggregated. This is because the lights from the light sources are superposed to be incident on the cylindrical lens array and then diffused by the cylindrical lens array, which renders the surfaces of the cylindrical lenses to be regarded as a surface light source having a uniform spatial distribution. As a result, happening of cyclic unevenness in luminance in an image visually recognized by the observer by the light arriving at the eye-box is suppressed.

As illustrated in FIG. 9, the luminance distribution in the eye-box of the second comparative example in which the cylindrical lens array is provided on the emission surface of the light guide panel is observed to have a feature between those of the example illustrated in FIG. 7 and the first comparative example illustrated in FIG. 8. In the second comparative example, cyclic unevenness in luminance is more suppressed than the first comparative example having no cylindrical lens array, but is not suppressed to a level of the example. This is because the position of the cylindrical lens array on an optical path is close to the light sources, so that the lights are not sufficiently superposed at the surface of the cylindrical lens array, and thus the surface of the cylindrical lens array can be regarded as a light source having unevenness in spatial distribution. In contrast, in the case of the example illustrated in FIG. 7, the cylindrical lens array is provided to the optical member disposed between the light guide panel and the display panel, that is, at a position far from the light sources, so that the lights from the light sources are sufficiently superposed at the surface of the cylindrical lens array. Accordingly, the surface of the cylindrical lens array can be regarded as a light source having a further uniform spatial distribution.

When the Fresnel lens 40a exists between the light guide panel 36 and the display panel 30 as illustrated in FIG. 4, providing the cylindrical lens array to the light guide panel as in the second comparative example causes a loss of light. That is, when a light is diffused by the cylindrical lens array before entering the Fresnel lens, an amount of light incident on a sag of the Fresnel lens increases. The light incident on the sag is unusable, so that luminance is reduced.

According to the present embodiment described above, the display device 20 of the head-up display including a plurality of light sources 34 can suppress cyclic unevenness in luminance in an image visually recognized by an observer.

The present disclosure has been described with reference to the embodiment described above. However, the exemplary embodiment of the present disclosure are not limited to this configuration.

In the embodiment described above, as illustrated in FIG. 3, the prism array 38a of the optical member 38 causes the light L emitted from the display panel 30 to have a first angle θ with respect to the normal direction N of the display panel 30 as viewed in the longitudinal direction S2 (X-axis direction) of the display panel 30. As illustrated in FIG. 4, the Fresnel lens 40a of the optical member 40 causes the light L emitted from the display panel 30 to have a second angle ¢ with respect to the normal direction N of the display panel 30 as viewed in the lateral direction S1 (Y-axis direction) of the display panel 30. However, the embodiment of the present disclosure is not limited to such configuration.

For example, in addition to or instead of the center Cf of a circle of the Fresnel lens 40a being shifted from the center Cd of the transmissive region of the display panel 30 in the longitudinal direction S2 (X-axis direction) of the display panel 30, the center Cf may be shifted in the lateral direction S1 (Y-axis direction). In this manner, the first angle θ may be created by the prism array 38a of the optical member 38 and the Fresnel lens 40a of the optical member 40.

Furthermore, when the display panel 30 emits a light at the first angle θ with respect to the normal direction N as viewed in the longitudinal direction S2 (X-axis direction), and the light guide panel 36 emits a light at substantially the same angle as the first angle θ as viewed in the same direction, the prism array 38a, that is, the optical member 38 may be omitted. Additionally or alternatively, when the display panel 30 needs not to emit a light at the second angle q with respect to the normal direction N as viewed in the lateral direction S1 (Y-axis direction) of the display panel 30, the Fresnel lens 40a may be omitted. In this case, the incident surface (a surface on the optical member 40 side) of the optical member 38 is made flat.

Furthermore, in the embodiment described above, as illustrated in FIGS. 3 and 4, the display panel 30 is parallel to the emission surface 36b of the light guide panel 36. However, the embodiment of the present disclosure is not limited to such configuration. For example, the display panel 30 may be inclined with respect to the emission surface 36b of the light guide panel 36. With this inclination, at least a part of at least one of the first angle θ and the second angle φ can be created.

Furthermore, in the embodiment described above, a plurality of light sources 34 is arranged in the longitudinal direction S2 (X-axis direction) of the display panel 30 as illustrated in FIG. 2. However, the embodiment of the present disclosure is not limited to such configuration. A plurality of light sources 34 may be arranged in the lateral direction S1 (Y-axis direction) of the display panel 30.

Furthermore, in the embodiment described above, as illustrated in FIG. 1, the head-up display 14 is mounted on the vehicle 10 such as an automobile. However, a mobile object on which the head-up display is mounted is not limited to a vehicle. The mobile object may be a vehicle in which a person rides, for example, an airplane or a ship. The mobile object may be a drone. The mobile object may not be a travelling one but may be a one that operates (for example, vibrate) on the spot.

As described above, a plurality of embodiments has been described as examples of techniques of the present disclosure. For this purpose, the accompanying drawings and the detailed description have been provided.

Thus, the components described in the accompanying drawings and the detailed description may include not only components essential for solving the problem but also components that are not essential for solving the problem in order to illustrate the technique. Accordingly, it should not be immediately recognized that these non-essential components are essential because these non-essential components are described in the accompanying drawings and the detailed description.

In addition, the embodiment is described above to illustrate the technique of the present disclosure, so that various changes, replacements, additions, omissions, and the like can be made for the embodiment within the scope of the claims and equivalents thereof.

The present disclosure is applicable to a display device. The present disclosure is also applicable to a head-up display.

The invention claimed is:

1. A display device comprising:
   a display panel that displays an image;
   a plurality of light sources arranged in a first direction orthogonal to a normal direction of the display panel;
   a light guide panel on which a light from the plurality of light sources is incident and including an emission surface that emits a light toward the display panel; and
   a first optical member disposed between the display panel and the light guide panel and including a first surface opposing the emission surface of the light guide panel, a second surface provided opposite to the first surface to oppose the display panel, a Fresnel lens provided on the first surface, and an optical array provided on the second surface, wherein
   the optical array emits and diffuses a light toward the display panel, and
   as viewed in at least one of the first direction and a second direction orthogonal to both the normal direction and the first direction, the Fresnel lens emits a light passing through a center of the display panel in a direction inclined with respect to the normal direction.

2. The display device according to claim 1, wherein
a center of a transmissive region of the display panel and a center of the Fresnel lens are shifted from each other in at least one of the first direction and the second direction, as viewed in the normal direction of the display panel.

3. The display device according to claim 2, wherein,
when, as viewed in the second direction, a focal length of the Fresnel lens is F, a shift amount between the center of the transmissive region of the display panel and the center of the Fresnel lens is D, and an angle, created by a shift between the center of the transmissive region of the display panel and the center of the Fresnel lens, of a light passing through the center of the transmissive region of the display panel with respect to the normal direction is φ, the following formula is satisfied:

$$\varphi = 90° - \tan^{-1}(F/D).$$

4. The display device according to claim 1, further comprising:
   a second optical member disposed between the light guide panel and the first optical member, the second optical member being provided with a prism array on a surface opposing the emission surface of the light guide panel,
   wherein the prism array includes a plurality of prisms arranged in the second direction orthogonal to both the normal direction of the display panel and the first direction, as viewed in the normal direction of the display panel.

5. The display device according to claim 1, wherein
the optical array includes a plurality of cylindrical lenses arranged in the first direction.

6. A head-up display comprising the display device according to claim 1.

7. A mobile object comprising:
the head-up display according to claim 6; and
a windshield on which an image output from the head-up display is projected.

8. The display device according to claim 2, further comprising:
   a second optical member disposed between the light guide panel and the first optical member, the second optical member being provided with a prism array on a surface opposing the emission surface of the light guide panel,
   wherein the prism array includes a plurality of prisms arranged in the second direction orthogonal to both the normal direction of the display panel and the first direction, as viewed in the normal direction of the display panel.

9. The display device according to claim 3, further comprising:
   a second optical member disposed between the light guide panel and the first optical member, the second optical member being provided with a prism array on a surface opposing the emission surface of the light guide panel, wherein the prism array includes a plurality of prisms arranged in the second direction orthogonal to both the normal direction of the display panel and the first direction, as viewed in the normal direction of the display panel.

10. A display device comprising:

a display panel that displays an image;

a light source unit that emits a flat light toward the display panel, and a first optical member disposed between the display panel and the light source unit, the first optical member having first and second surfaces which face away from each other in opposite directions, wherein the first surface faces away from the display panel and includes a Fresnel lens on which a light from the light source unit is incident, and the second surface opposes and faces the display panel, an optical array being provided on the second surface, wherein the optical array emits and diffuses a light toward the display panel, and as viewed in at least one of a first direction and a second direction which are orthogonal to each other and which are each orthogonal to a normal direction of the display panel, the Fresnel lens emit a light passing through a center of the display panel in a direction inclined with respect to the normal direction.

11. A head-up display comprising the display device according to claim 10.

12. A mobile object comprising:

the head-up display according to claim 11; and a windshield on which an image output from the head-up display is projected.

* * * * *